United States Patent
Dorris et al.

(10) Patent No.: US 11,927,686 B2
(45) Date of Patent: Mar. 12, 2024

(54) DETERMINING A FLIGHT PATH OF AN OBJECT

(71) Applicant: Zebra Technologies Corporation, Lincolnshire, IL (US)

(72) Inventors: Thomas Dorris, Frederick, MD (US); Adam Imran, McLean, VA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 548 days.

(21) Appl. No.: 17/127,526

(22) Filed: Dec. 18, 2020

(65) Prior Publication Data
US 2022/0196783 A1    Jun. 23, 2022

(51) Int. Cl.
*G01S 5/02* (2010.01)
*A63B 24/00* (2006.01)
*G01S 5/06* (2006.01)
*G06T 17/00* (2006.01)

(52) U.S. Cl.
CPC ........ *G01S 5/0294* (2013.01); *A63B 24/0021* (2013.01); *G01S 5/06* (2013.01); *G06T 17/00* (2013.01); *A63B 2024/0034* (2013.01); *A63B 2220/62* (2013.01); *A63B 2220/833* (2013.01); *A63B 2225/54* (2013.01); *A63B 2243/007* (2013.01)

(58) Field of Classification Search
CPC ................................ G01S 5/0294; G01S 5/06
USPC ............................ 342/465, 423, 455, 104, 70
See application file for complete search history.

(56) References Cited

U.S. PATENT DOCUMENTS

| 2007/0002039 A1 | 1/2007 | Pendleton et al. |
| 2013/0095961 A1 | 4/2013 | Marty et al. |
| 2014/0301598 A1 | 10/2014 | Marty et al. |
| 2020/0298080 A1* | 9/2020 | Zhang ................... G06N 3/045 |

FOREIGN PATENT DOCUMENTS

WO    03022366 A2    3/2003

OTHER PUBLICATIONS

Search Report for Spanish Application No. 202131105 dated Jul. 22, 2022.
Substantive Examination Report for the Spanish Application No. 202131105 dated Jan. 18, 2023.

* cited by examiner

*Primary Examiner* — Bo Fan (57) ABSTRACT

A non-transitory computer-readable medium storing a plurality of computer-readable instructions executable by a processor, wherein execution of the instructions configures the processor to: obtain location data representing a ground path of a flight of an object; determine, from the location data, a first ground distance and a second ground distance traversed by the object during an ascent phase and a descent phase of the flight of the object, respectively; determine an initial angle of the flight of the object; determine an initial airspeed of the object based on the determined initial angle; determine an air drag value for the object during the flight based on the determined initial angle and the determined initial airspeed; output a flight path of the object, the flight path representing a three-dimensional path travelled by the object during the flight and determined based on the initial angle, the initial airspeed and the air drag value.

20 Claims, 6 Drawing Sheets

DETERMINING A FLIGHT PATH OF AN OBJECT

BACKGROUND

Real time location systems use radio frequency identification to locate and track objects in a monitored region. A lack of vertical variance of the locations of the receivers may make tracking objects in flight difficult and inaccurate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including a memory; and a processor interconnected with the memory, the processor configured to: obtain location data representing a ground path of a flight of an object; determine, from the location data, a first ground distance traversed by the object during an ascent phase of the flight of the object; determine, from the location data, a second ground distance traversed by the object during a descent phase of the flight of the object; determine an initial angle of the flight of the object based on the first ground distance and the second ground distance; determine an initial airspeed of the object based on the determined initial angle; determine an air drag value for the object during the flight based on the determined initial angle and the determined initial airspeed; output a flight path of the object, the flight path representing a three-dimensional path travelled by the object during the flight and determined based on the initial angle, the initial airspeed and the air drag value.

Additional examples disclosed herein are directed to a method comprising: obtaining location data representing a ground path of a flight of an object; determining, from the location data, a first ground distance traversed by the object during an ascent phase of the flight of the object; determining, from the location data, a second ground distance traversed by the object during a descent phase of the flight of the object; determining an initial angle of the flight of the object based on the first ground distance and the second ground distance; determining an initial airspeed of the object based on the determined initial angle; determining an air drag value for the object during the flight based on the determined initial angle and the determined initial airspeed; outputting a flight path of the object, the flight path representing a three-dimensional path travelled by the object during the flight and determined based on the initial angle, the initial airspeed and the air drag value.

Figure 1:
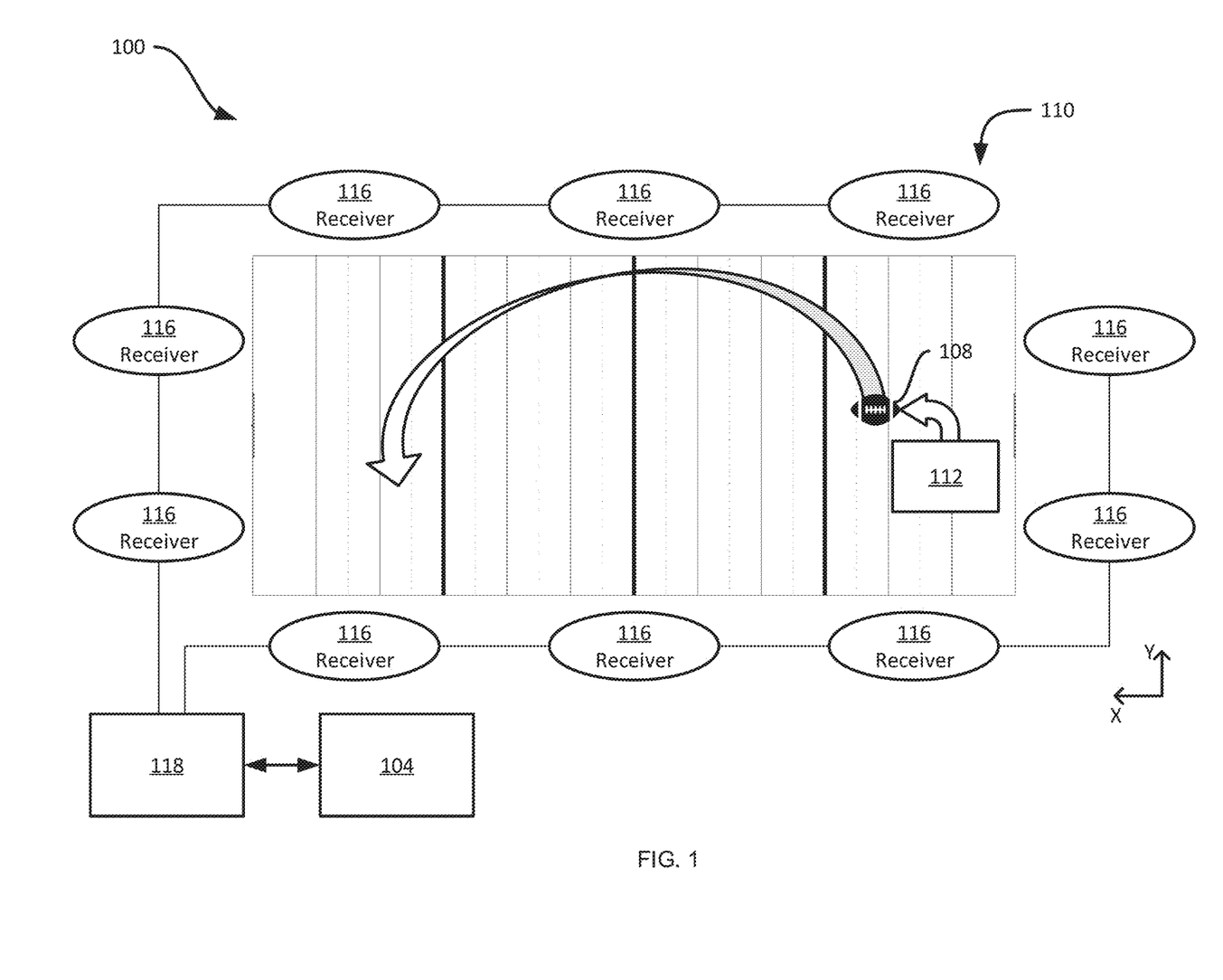
FIG. 1 is a schematic diagram of a system for determining a flight path of an object.

FIG. 1 depicts an example system 100 including a computing device 104 configured to determine a flight path of an object 108 and a locating subsystem 110 to determine a location of the object 108.

The computing device 104 may be a server, a computing device such as a laptop computer, a desktop computer, a mobile device or the like. The computing device 104 is generally configured to obtain a ground path of the object 108 during its flight from the locating subsystem 110 and determine the flight path of the object 108 based on said ground path. For example, in the presently illustrated example, the object 108 may be a football which is thrown or kicked across a portion of a football field. In particular, the ground path represents the two-dimensional or XY-coordinates of the object 108 during its flight. That is, the ground path may be represented by a perpendicular projection of the object 108 onto the ground during its flight. The computing device 104 may then apply a series of computations to the location data representing the ground path to determine a flight path based on the ground path. In particular, the flight path of the object 108 represents the three-dimensional or XYZ-coordinates of the object 108 during its flight.

The locating subsystem 110 is generally configured to determine the location of the object 108. In particular, the locating subsystem 110 includes a tag 112 associated with the object 108, a plurality of receivers 116 and a central processor/hub 118.

The tag 112 is a real time location system (RTLS) tag configured to transmit a tag signal for determining the real-time location of the tag 112. For example, the tag 112 may employ radio frequency identification (RFID) techniques, such as an ultra-wide band transmitter that transmits a tag signal comprising a burst, and optionally, a burst having a tag data packet that may include tag data elements that may include, but are not limited to, a tag unique identification number (tag UID), other identification information and the like. In the present example, the tag 112 is associated with the object 108 expected to take flight within a monitored region of the locating subsystem 110. In some examples the locating subsystem 110 may further include one or more reference tags that may employ radio frequency identification (RFID) techniques, such as an ultra-wide band transmitter that transmits a reference tag signal comprising a burst, and optionally, a reference tag burst having a reference tag data packet that may include reference tag data elements that may include, but are not limited to, a reference tag unique identification number (tag UID), other identification information and the like. In some examples, the reference tags may be positioned at predetermined coordinates within and/or around the monitored region. In some examples, the locating subsystem 110 may further include additional tags (not shown) to locate other objects or assets within the monitored region, including other objects which may take flight.

The receivers 116 may include sensors and/or other suitable devices to receive the signals transmitted by the tag 112. Each of the receivers 116 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 112. The TOA data associated with the tag 112 may be recorded and sent to the processor 108 to determine the location of the object 108 associated with the tag 112 at the time of receipt of the signal. The receivers 116 may be positioned at predetermined coordinates within and/or around the monitored region.

The central processor 118 accumulates TOAs, whereby the TOAs represent a relative time of flight (TOF) of a signal emitted from the tag 112 as recorded at each receiver 116. That is, the computing device 104 may determine the tag location (i.e., the object location) by processing TOA measurements relative to multiple data packets detected by the receivers 116. For example, the central processor 118 may locate the signal source by solving an error minimization function of a location estimate determined by the time of arrival (TOA) of a burst signal received at multiple receivers 116. In some examples, the locating subsystem 110 may further include a reference tag 114, such as a UWB transmitter, positioned at known coordinates to determine measure the relative phase at the receivers 116. In some examples, the locating system may use the differences in TOA of a tag signal at multiple receivers to estimate location; in some examples the system may use the difference between the TOA of a tag signal at a receiver and the TOA of a reference tag signal at the receiver to estimate location; such examples may be described as Time Difference of Arrival (TDOA) locationing systems.

The central processor 118 is therefore configured to provide at least two- or three-dimensional localization of the object 108. More particularly, the central processor 118 may determine when the object 108 is in flight and a ground path of the object 108 during its flight. For example, to determine when the object 108 is in flight, the central processor 118 may determine the z-coordinate or height of the tag 112 and hence the object 108. If the z-coordinate is above a predefined threshold (e.g., an average height of a human or an average reach of a human), the central processor 118 may determine that the object 108 is in flight. In other examples, the central processor 118 may determine that the object 108 is in flight by other methods, such as based on other data received from other sensors associated with or monitoring the object 108.

Notably, the receivers 116 may be located at predefined locations around the monitored region, but, based on physical restrictions, may not include a large vertical spread. Accordingly, the precision of the z-coordinate determined based on the signals received from 112 may be poor, in comparison to the precision of the x- and y-coordinates. Thus, the three-dimensional coordinates determined by the central processor 118 may not accurately represent the actual flight path of the object 108. Accordingly, rather than directly generating an estimated flight path of the object 108, the central processor 118 may generate a ground path to be provided to the computing device 104 for use in determining the flight path.

In particular, the ground path may be used to determine the initial airspeed, initial angle, and an air drag value experienced by the object 108 during flight. In some examples, models may be run for each combination of potential initial airspeed, initial angle, and air drag value, to find a combination which produces the detected ground path, however such modelling may be time consuming and result in multiple combinations which match the ground path. Accordingly, as described below, the ground path may first be used to derive the initial angle and initial airspeed prior to modelling the air drag value to match against the ground path.

Figure 2:
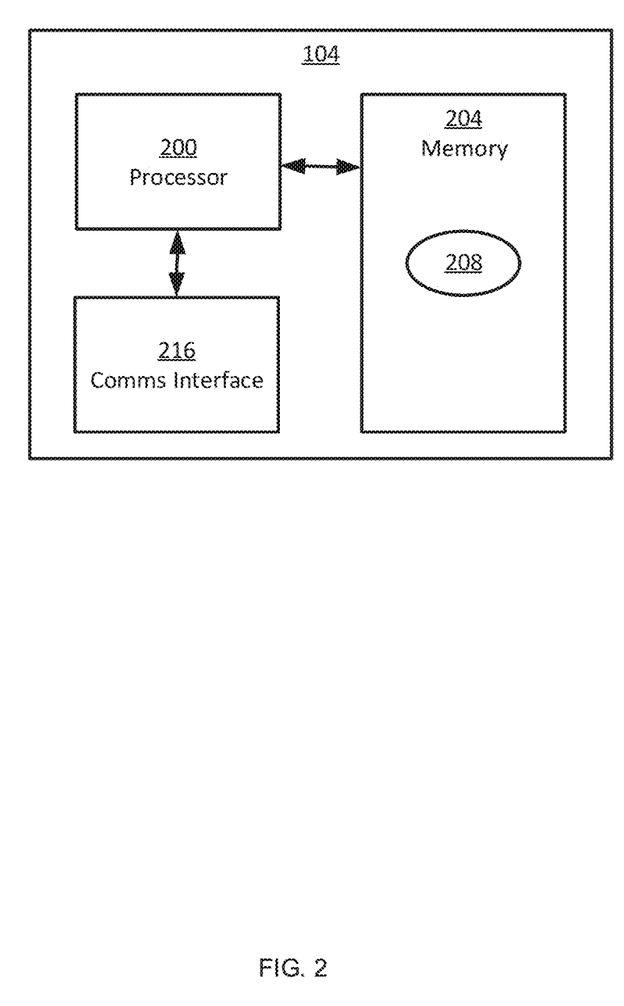
FIG. 2 is a block diagram of certain internal hardware components of a computing device in the system of FIG. 1.

Referring to FIG. 2, the computing device 104, including certain internal components, is shown in greater detail. The computing device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores a control application 208 which, when executed by the processor 200, configures the processor 200 to perform various functions discussed below in greater detail and related to the determination of the flight path of an object based on its ground path. The application 208 may also be implemented as a suite of distinct applications. The processor 200, when so configured by the execution of the application 208, may also be referred to as a controller 200.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the dimensioning operations discussed herein.

In some examples, the central processor 118 may be integrated with the processor 200. That is, the computing device 104, and in particular, the processor 200 may additionally perform the functionality described above with respect to the central processor 118 to determine when the object 108 is in flight and to determine a ground path of the object 108 during its flight.

The computing device 104 also includes a communications interface 216 interconnected with the processor 200. The communications interface 216 includes suitable hardware (e.g. transmitters, receivers, network interface controllers and the like) allowing the computing device 104 to communicate with other computing devices—such as the components of the locating subsystem 110. The specific components of the communications interface 216 are selected based on the type of network or other links that the server 104 is to communicate over. The computing device 104 can be configured, for example, to communicate with the central processor 118 to obtain a ground path or location data for the object 108, or the computing device 104 may be configured to communicate directly with the receivers 116, in examples where the functionality of the central processor 118 is integrated with and performed by the computing device 104.

The processor 200 may also be connected to one or more input and/or output devices (not shown). The input devices can include one or more keyboards, mice, touch-sensitive display screens or the like. The output devices can further include one or more display screens, sound generators, or the like for providing output or feedback to an operator.

Figure 3:
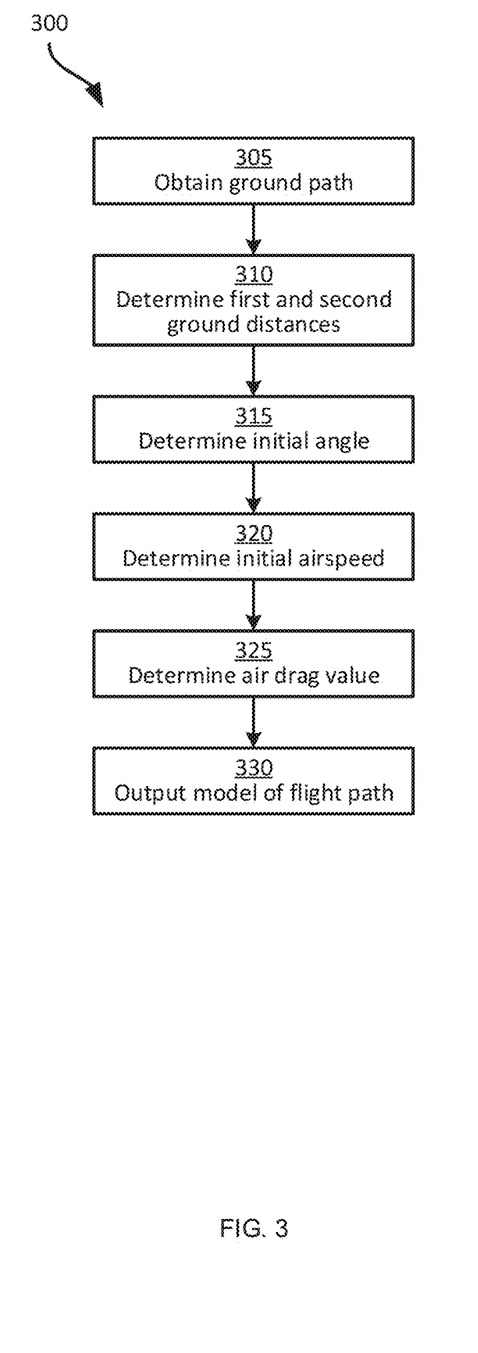
FIG. 3 is a flowchart of a method of determining a flight path of an object.

The functionality of the computing device 104, as implemented via execution of the applications 208 by the processor 200 will now be described in greater detail, with reference to FIG. 3. FIG. 3 illustrates a method 300 of determining a flight path of an object, which will be described in conjunction with its performance in the system 100, and in particular, by the computing device 104, with reference to the components illustrated in FIGS. 1 and 2. In other examples, the method 300 may be performed in other suitable systems.

At block 305, the computing device 104 obtains location data representing a ground path of a flight of the object 108. In particular, the ground path corresponds to the XY-coordinates of the object 108 over the duration of its flight. In some examples, the computing device 104 may receive the ground path from the locating subsystem 110. That is, the location data may define the ground path of the flight of the object 108. In other examples, the computing device 104 may receive raw location data for the object 108 from the locating subsystem 110 (i.e., the TOA data as recorded by the receivers 116) and compute the ground path of the object 108. This may include, for example, identifying the object 108 as being in flight and subsequently, the XY-coordinate representation (i.e., the ground path) of the flight of the object 108.

At block 310, the computing device 104 determines a first ground distance traversed by the object 108 during an ascent phase and a second ground distance traversed by the object 108 during a descent phase of the object's flight. That is, the first ground distance represents the distance traversed by the object 108 in the XY-plane from the start time of the flight (i.e., the time at which the object 108 initiates its flight) until an apex time of the flight (i.e., the time at which the object 108 reaches the apex of its flight). The second ground distance represents the distance traversed by the object 108 in the XY-plane from the apex time of the flight to the end time of the flight (i.e., the time at which the object 108 completes or ends its flight).

Figure 4:
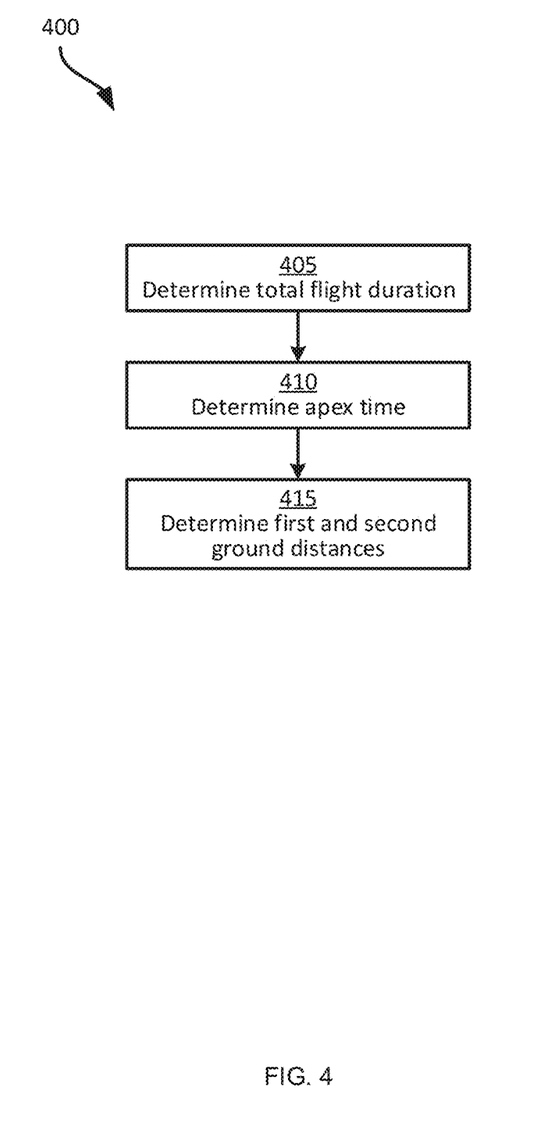
FIG. 4 is a flowchart of a method of determining the first and second ground distances at block 310 of the method of FIG. 3.

For example, referring to FIG. 4, an example method 400 of determining the first and second ground distances at block 310 of the method 300 is depicted.

At block 405, the computing device 104 determines a total flight duration of the object 108. That is, after obtaining the ground path of the flight of the object 108, the computing device 104 computes the amount of elapsed time between the start of the flight (i.e., an initial time associated with the initial location data for the ground path of the object 108) and the end of the flight (i.e., an end time associated with the end location data for the ground path of the object 108).

At block 410, the computing device 104 computes the apex time of the flight of the object 108 based on the total flight duration. In particular, within certain predefined conditions of the expected flight of the object 108 (e.g., initial air speed, initial angle, and other conditions), the apex time may correspond to the midpoint of the total flight duration. Specifically, under expected conditions constrained by the physical capabilities of a human throwing or kicking the object, such as a football, near the surface of the earth, experimental data shows that the time at which the apex of its flight corresponds to approximately the midpoint of the total flight duration. That is, under the expected conditions of the object in flight as based on physical capabilities of a human throwing the object, objects in flight take as much time to ascend to the apex of their flight as they do to return to the ground. Accordingly, the computing device 104 may define the halfway point of the duration of the flight to be the apex time, and the first half of the flight (i.e., the duration of the flight from the start time to the apex time) to be the ascent phase and the second half of the flight (i.e., the duration of the flight from the apex time to the end time) to be the descent phase.

At block 415, the computing device 104 determines the first and second ground distances. Specifically, having determined the apex time of the flight of the object 108, the computing device 104 obtains apex location (i.e., the XY-coordinates of the ground path associated with the apex time). The computing device 104 may then determine the distance along the ground path from the start of the ground path (i.e., from the XY-coordinates of the ground path associated with the start time) to the apex location and define this distance as the first ground distance traversed by the object 108 during the ascent phase. The computing device 104 may further determine the distance along the ground path from the apex location to the end of the ground path (i.e., the XY coordinates of the ground path associated with the end time) and define this distance as the second ground distance traversed by the object 108 during the descent phase. Since the ground path is defined in the XY-plane, the first and second ground distances may be computed according to normal Euclidean distances.

Returning to FIG. 3, at block 315, the computing device 104 determines an initial angle of the flight of the object 108 based on the first ground distance and the second ground distance. In particular, the ratio between the first ground distance and the second ground distance correlates to the initial angle at which the object 108 initiates its flight. Accordingly, the computing device 104 may compute, based on the first ground distance and the second ground distance, the initial angle using a predefined equation or set of equations embodying the correlation between the initial angle and the first and second ground distances.

Figure 5:
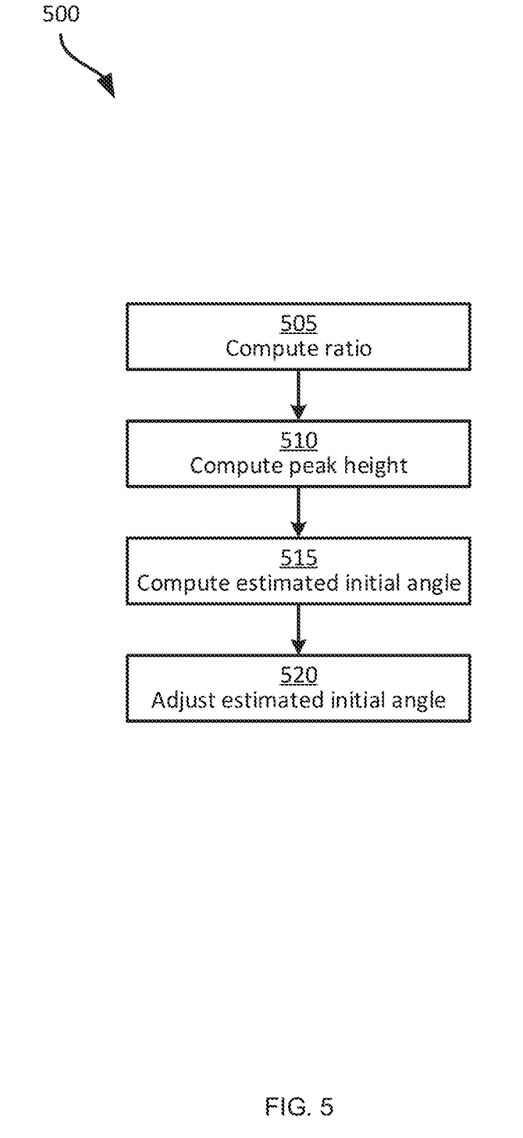
FIG. 5 is a flowchart of a method of determining the initial angle at block 315 of the method of FIG. 3.

For example, referring to FIG. 5, an example method 500 of computing the initial angle at block 315 of the method 300 is depicted.

At block 505, the computing device 104 computes a ratio of the first ground distance to the total ground distance, as specified in equation (1):

$$d_r = \frac{d_1}{d_1 + d_2} \tag{1}$$

In equation (1), $d_r$ represents the ratio, $d_1$ represents the first ground distance and $d_2$ represents the second ground distance. The ratio defined in equation (1) correlates to the initial angle at which the object 108 initiates its flight, and hence the computing device 104 may store the computed ratio for further processing, as described below.

At block 510, the computing device 104 computes a peak height of the flight of the object 108. In particular, the peak height may be computed based on a model of flight when no air drag is present. The computing device 104 may therefore compute the peak height according to equation (2):

$$h = \frac{1}{2} * g * (t_{apex})^2 \tag{2}$$

In equation (2), h represents the peak height, g represents the force of gravity and $t_{apex}$ represents the duration of the flight from the start time to the apex time, as determined for example as the half of the total duration of the flight. That is, based on the amount of time the object 108 spends in the ascent phase and the force of gravity acting on the object 108, the computing device 104 computes the peak height achievable by the object 108.

At block 515, the computing device 104 computes an estimated initial angle of the flight of the object 108. The estimated initial angle may be initially computed according to a basic parabolic shape the theoretical flight of the object 108 in under ideal, no drag conditions. That is, the computing device 104 may compute the estimated initial angle according to equation (3):

$$\theta_{est} = a\tan\left(2 * \frac{h}{d_1}\right) \quad (3)$$

In equation (3), $\theta_{est}$ represents the estimated initial angle. That is, if the object 108 had a flight path with z-values corresponding to a parabolic shape, $\theta_{est}$ represents the angle at which flight would need to be initiated to reach a peak height of h at a distance of $d_1$.

At block 520, after having computed an estimated initial angle, the computing device 104 adjusts the estimate of the initial angle using the ratio computed at block 505. That is, since the object 108 does experience air drag, the flight path may not correspond to a parabolic shape as assumed in equation (3). Based on known realistic parameters of flight of a given object, an equation may be developed to adjust the estimated initial angle using the ratio computed at block 505. For example, equation (4) provides a method of adjusting the estimated initial angle:

$$\theta = \theta_{est}/(1+0.7636*\cos(\theta_{est})*(d_r-0.5)) \quad (4)$$

In equation (4), θ represents the adjusted initial angle. The computing device 104 may therefore define the resulting adjusted initial angle as the initial angle of the flight of the object 108. That is, while equations (2) and (3) compute intermediate simple values based on the zero-drag case, equation (4) applies the ratio computed at block 505 to account for drag experienced by the object 108.

Returning again to FIG. 3, after having determined the initial angle, at block 320, the computing device 104 determines the initial airspeed of the object 108. In particular, the computing device 104 may first use the location data defining the ground path to determine the ground speed of the object 108 (i.e., the speed of the object 108 along the ground path at the start location and start time). Having computed the initial ground speed of the object 108, the computing device 104 may project the initial ground speed onto a vector defined by the initial angle in order to determine the initial airspeed of the object 108.

At block 325, the computing device 104 uses the initial angle determined at block 315, the initial airspeed determined at block 320 as well as the ground path obtained at block 305 to determine an air drag value experienced by the object 108 during its flight. Specifically, multiple drag factors which may affect the flight path of the object 108 may be rolled into a single air drag value which best represents the overall drag experienced by the object 108 over the duration of its flight path.

Figure 6:
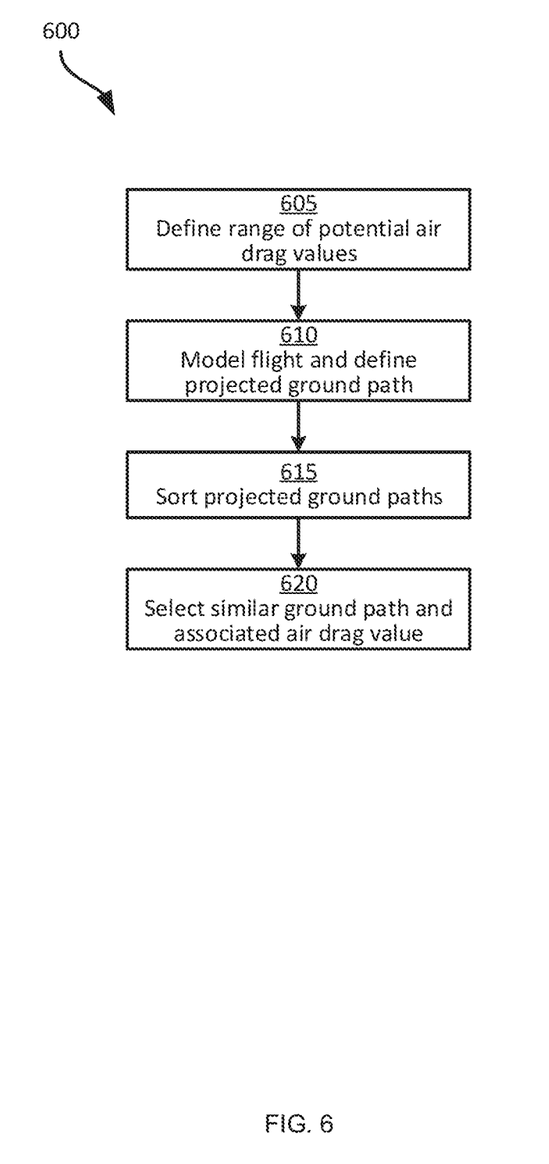
FIG. 6 is a flowchart of a method of determining the air drag value at block 325 of the method of FIG. 3.

For example, referring to FIG. 6, an example method 600 of determining the air drag value at block 325 is depicted.

At block 605, the computing device 104 defines, based on the parameters of the flight of the object 108, a range of potential air drag values. For example, the parameters affecting the air drag values may include the size and shape of the object 108. In some examples, the range of potential air drag values may be further defined and narrowed based on other parameters of the flight, such as the physical capabilities of the source of the flight (e.g., capabilities of a human launching the object into flight) and the manner of initiation of the flight (e.g., a human throwing versus kicking the object into flight).

At block 610, the computing device 104 models, for each potential air drag value in the range defined at block 605, the flight of the object 108 in view of the initial angle determined at block 315, the initial airspeed determined at block 320, and the selected potential air drag value. The computing device 104 further defines a projected ground path associated with each potential air drag value, where the projected ground path represents the ground path taken if the object experienced the selected potential air drag value. That is, the computing device 104 defines a projected ground path associated with a projected flight of the object experiencing the potential air drag value.

At block 615, the computing device 104 sorts the projected ground paths based on similarity to the ground path obtained at block 305. For example, the computing device 104 may compute an error value representing the error rate between a given projected ground path and the actual ground path of the object 108 during its flight.

At block 620, the computing device 104 selects the projected ground path based on a similarity to the actual ground path of the object 108 and defines the associated air drag value as the determined air drag value experienced by the object 108. That is, the computing device 104 may identify the projected ground path having the smallest error value when compared to the actual ground path of the object 108. The potential air drag value corresponding to the identified ground path (i.e., the air drag value which, when applied to the flight of the object 108 given the determined the initial airspeed and initial angle, generates the identified ground path) is determined to be the air drag value experienced by the object 108.

Returning again to FIG. 3, at block 330, the computing device 104 determines a flight path of the object 108 during its flight. In particular, having computed the initial angle, initial airspeed, and air drag value, the computing device 104 applies the determined parameters to the flight of the object 108 to a predefined model to obtain a flight path defining XYZ-coordinates of the object 108 during its flight. That is, the flight path represents the three-dimensional path travelled by the object 108 during its flight.

When determining the flight path of the object 108, the computing device 104 may additionally assume initial and terminal Z-coordinates based on the predefined conditions of the expected flight of the object 108. For example, in the instance of a football being thrown or passed, the initial and terminal Z-coordinates may be assumed to be about shoulder height for a human (e.g., about 5 to 6 feet). In some examples, where player information is available, the height of the player throwing the football may be used to estimate the initial Z-coordinate. In the instance of a football being kicked, ground level may be used to assume the initial and terminal Z-coordinates.

The computing device 104 further outputs the flight path of the object 108. For example, the computing device 104 may communicate the XYZ-coordinates corresponding to the flight path to another computing device, such as a server, a mobile or desktop computer, or the like. In some examples, the computing device 104 may display the flight path on a display of the computing device 104. In particular, displaying the flight path may include displaying an apex height of the object 108 during its flight. For example, the computing device 104 may generate a three-dimensional interactive model and display the model at the display. In some examples, the model may additionally include location data and graphical representations of other objects or assets tracked by tags 112 in the monitored region of the locating subsystem 110. The model may additionally track and store airspeed data and other flight data for each point in the flight path.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A non-transitory computer-readable medium storing a plurality of computer-readable instructions executable by a processor, wherein execution of the instructions configures the processor to:
   obtain location data representing a ground path of a flight of an object;
   determine, from the location data, a first ground distance traversed by the object during an ascent phase of the flight of the object;
   determine, from the location data, a second ground distance traversed by the object during a descent phase of the flight of the object;
   determine an initial angle of the flight of the object based on the first ground distance and the second ground distance;
   determine an initial airspeed of the object based on the determined initial angle;
   determine an air drag value for the object during the flight based on the determined initial angle and the determined initial airspeed;
   output a flight path of the object, the flight path representing a three-dimensional path travelled by the object during the flight and determined based on the initial angle, the initial airspeed and the air drag value.

2. The non-transitory computer-readable medium of claim 1, wherein, to determine the first ground distance and the second ground distance, the instructions configure the processor to:
   determine a total flight duration;
   compute an apex time as a halfway point of the duration of the flight;
   obtain an apex location based on the apex time; and
   define the first ground distance to be the distance along the ground path from a start of the ground path to the apex location and the second ground distance to be the distance along the ground path from the apex location to an end of the ground path.

3. The non-transitory computer-readable medium of claim 1, wherein, to determine the initial angle, the instructions configure the processor to:
   compute a ratio of the first ground distance to a total ground distance;
   compute a peak height of the flight of the object;
   compute an estimated initial angle based on the first ground distance and the peak height; and
   adjust the initial angle based on the ratio.

4. The non-transitory computer-readable medium of claim 1, wherein, to determine the initial airspeed, the instructions configure the processor to:
   determine an initial ground speed of the object based on the location data; and
   project the initial ground speed onto a vector defined by the initial angle to determine the initial airspeed.

5. The non-transitory computer-readable medium of claim 1, wherein, to determine the air drag value, the instructions configure the processor to:
   define a range of potential air drag values;
   define, for each potential air drag value in the range, a projected ground path associated with a projected flight of the object experiencing the potential air drag value;
   select the projected ground path based on a similarity to the ground path of the flight of the object; and
   define the potential air drag value associated with the selected projected ground path as the determined air drag value.

6. The non-transitory computer-readable medium of claim 5, wherein the range of potential air drag values is defined based on one or more of: a size of the object; a shape of the object; physical capabilities of a source of the flight of the object; and a manner of initiation of the flight.

7. The non-transitory computer-readable medium of claim 1, wherein, to output the flight path, the instructions configure the processor to: display a model of the flight path at an output device of the computing device.

8. The non-transitory computer-readable medium of claim 1, wherein the instructions configure the processor to, to obtain the ground path, retrieve the ground path from a locating subsystem in communication with the computing device.

9. The non-transitory computer-readable medium of claim 1, wherein, to obtain the ground path, the instructions configure the processor to:
   receive location data representing time of arrivals of a signal emitted from a tag associated with the object as recorded by a plurality of receivers;
   identify, based on the location data, the flight of the object; and
   define the ground path of the flight of the object based on the location data.

10. A method comprising:
    obtaining location data representing a ground path of a flight of an object;
    determining, from the location data, a first ground distance traversed by the object during an ascent phase of the flight of the object;
    determining, from the location data, a second ground distance traversed by the object during a descent phase of the flight of the object;
    determining an initial angle of the flight of the object based on the first ground distance and the second ground distance;
    determining an initial airspeed of the object based on the determined initial angle;
    determining an air drag value for the object during the flight based on the determined initial angle and the determined initial airspeed;
    outputting a flight path of the object, the flight path representing a three-dimensional path travelled by the object during the flight and determined based on the initial angle, the initial airspeed and the air drag value.

11. The method of claim 10, wherein determining the first ground distance and the second ground distance comprises:
    determining a total flight duration;
    computing an apex time as a halfway point of the duration of the flight;
    obtaining an apex location based on the apex time; and
    defining the first ground distance to be the distance along the ground path from a start of the ground path to the apex location and the second ground distance to be the distance along the ground path from the apex location to an end of the ground path.

12. The method of claim 10, wherein determining the initial angle comprises:
    computing a ratio of the first ground distance to a total ground distance;
    computing a peak height of the flight of the object;
    computing an estimated initial angle based on the first ground distance and the peak height; and
    adjusting the initial angle based on the ratio.

13. The method of claim 10, wherein determining the initial airspeed comprises:
    determining an initial ground speed of the object based on the location data; and
    projecting the initial ground speed onto a vector defined by the initial angle to determine the initial airspeed.

14. The method of claim 10, wherein determining the air drag value comprises:
    defining a range of potential air drag values;
    defining, for each potential air drag value in the range, a projected ground path associated with a projected flight of the object experiencing the potential air drag value;
    selecting the projected ground path based on a similarity to the ground path of the flight of the object; and
    defining the potential air drag value associated with the selected projected ground path as the determined air drag value.

15. The method of claim 14, wherein the range of potential air drag values is defined based on one or more of: a size of the object; a shape of the object; physical capabilities of a source of the flight of the object; and a manner of initiation of the flight.

16. The method of claim 10, wherein outputting the flight path comprises: displaying a model of the flight path at an output device of the computing device.

17. The method of claim 10, wherein obtaining the ground path comprises retrieving the ground path from a locating subsystem in communication with the computing device.

18. The method of claim 10, wherein obtaining the ground path comprises:
   receiving location data representing time of arrivals of a signal emitted from a tag associated with the object as recorded by a plurality of receivers;
   identifying, based on the location data, the flight of the object; and
   defining the ground path of the flight of the object based on the location data.

19. A system comprising:
   a plurality of receivers configured to receive tag data representing an object;
   a processor interconnected with the plurality of receivers, the processor configured to:
      obtain the tag data from the receivers;
      determine, based on the tag data, location data representing a ground path of a flight of the object;
      determine, from the location data, a first ground distance traversed by the object during an ascent phase of the flight of the object;
      determine, from the location data, a second ground distance traversed by the object during a descent phase of the flight of the object;
      determine an initial angle of the flight of the object based on the first ground distance and the second ground distance;
      determine an initial airspeed of the object based on the determined initial angle;
      determine an air drag value for the object during the flight based on the determined initial angle and the determined initial airspeed;
      output a flight path of the object, the flight path representing a three-dimensional path travelled by the object during the flight and determined based on the initial angle, the initial airspeed and the air drag value.

20. The system of claim 19, wherein the processor is further configured to display an apex height of the object during the flight.

* * * * *